United States Patent [19]
Kreft

[11] Patent Number: 4,862,983
[45] Date of Patent: Sep. 5, 1989

[54] TRUCK BODY MOUNT

[76] Inventor: Bruce W. Kreft, c/o South Florida Mack Trucks, Inc. P.O. Box 21186, 1700 Eller Dr., Ft. Lauderdale, Fla. 33335

[21] Appl. No.: 675,028

[22] Filed: Nov. 26, 1984

[51] Int. Cl.⁴ ............................................. B62D 33/06
[52] U.S. Cl. ................................... 180/89.13; 267/166
[58] Field of Search ........................... 180/89.13, 89.14; 267/60, 150, 166

[56] References Cited

U.S. PATENT DOCUMENTS

| | | | |
|---|---|---|---|
| 3,316,581 | 5/1967 | Hornsby | 267/60 |
| 3,411,806 | 11/1968 | Bellairs | 267/60 |

FOREIGN PATENT DOCUMENTS

| | | | |
|---|---|---|---|
| 123570 | 9/1980 | Japan | 180/89.13 |
| 644982 | 1/1979 | U.S.S.R. | 180/89.13 |

Primary Examiner—Charles A. Marmor
Assistant Examiner—Ross Weaver
Attorney, Agent, or Firm—Joseph Zallen

[57] ABSTRACT

A spring-loaded mount for connecting a truck body to a truck chassis which permits articulation comprising outwardly extending gungeon pin means attached to the chassis and cooperable spring means attached to the body; said spring means comprising a housing surrounding said gungeon pin means and containing a pair of springs acting on opposite sides of said gungeon pin means.

6 Claims, 3 Drawing Sheets

TRUCK BODY MOUNT

BACKGROUND OF INVENTION

This invention relates to improved mounts for attaching truck bodies to truck chassis.

The prior art describes mounts which attach a truck body to a truck chassis. These mounts typically comprise insulators which absorb high frequency vibrations and which are fastened by bolts. When road or operating conditions change, as for example, making a sharp turn or driving over rough terrain, the prior art mounts frequently require retorquing such as retightening the bolts. The clamping forces of the bolts that pass through these insulators is dependent on the resilience of the insulators and their ability to maintain their resilience. When resilience is low a bolt can become loose and ineffective. Further, petroleum products, ozone, acids and abrasion can severly shorten the life of the insulators. There is substantially no articulation of the frame on the chassis. The prior art is exemplified by U.S. Pat. Nos. 3,479,081; 4,043,585; 4,225,153; 4,283,066; and 4,286,777.

One object of the present invention is to provide a mount for attaching a truck body to a truck chassis, where there is no stress load on the chassis or body when at rest, and the body can articulate independently of the chassis frame.

Other objects and advantages of this invention will be apparent from the description and claims which follow taken together with the appended drawings.

SUMMARY OF INVENTION

This invention comprises generally a spring-loaded mount for connecting a truck body to a truck chassis which permits articulation. The minor stresses are absorbed through springs but the high stresses are either transmitted to the frame or absorbed by the energy of the articulation. The mount comprises an outwardly-extending gungeon pin means attached to the chassis and cooperable spring means attached to the body. The spring means includes a housing which surrounds the gungeon pin means which contains a pair of springs acting on both sides of the gungeon pin means. Although the following description of the invention shows the gungeon pin means attached to the chassis and the spring means attached to the body, this can be reversed so that the gungeon pin means are attached to the body and the spring means attached to the chassis.

The spring means includes a stop for each of the pair of springs so as to avoid breaking the springs upon total compression. In its preferred form the spring housing comprises a frame having a pair of opposing side braces, a top member, a bottom member and an extension for securing the frame to the body. A slidable collar surrounds the gangeon pin so as to isolate it from direct contact with the springs. A vibration-absorbing material is usually spaced between the body and the chassis. Such material can be plastic or elastomer. One useful material is ultra high molecular weight polyethylene typically in strips of about one inch thick to two inches wide.

SPECIFIC EXAMPLE OF INVENTION

Figure 1:
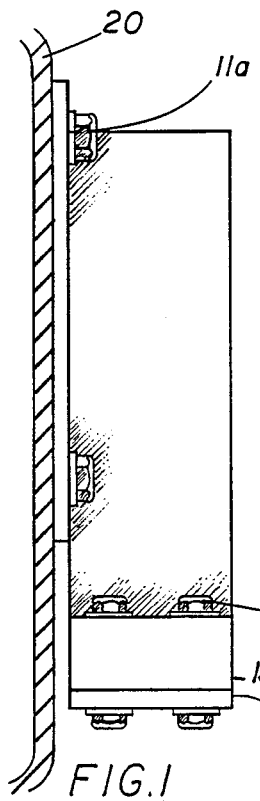
FIG. 1 is a side view of an example of this invention attached to the chassis of a truck.
Figure 2:
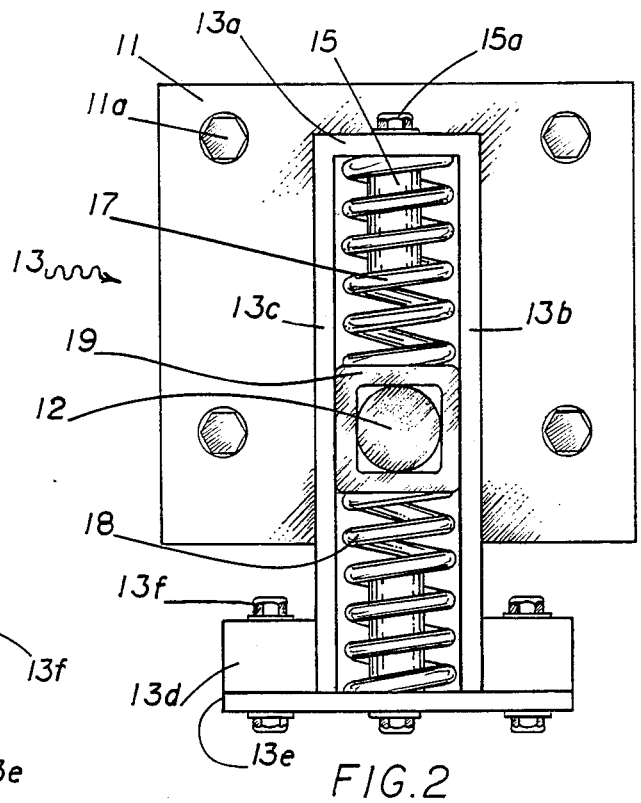
FIG. 2 is a front view of the invention.
Figure 3:
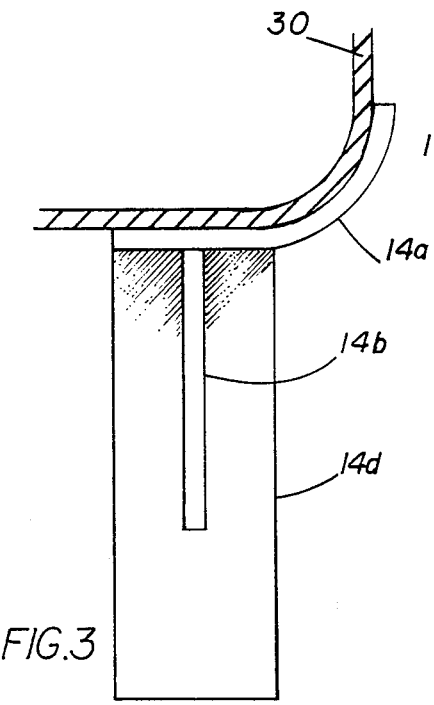
FIG. 3 is a side view of an adaptor member which is attached to the body and engages the device attached to the chassis.
Figure 4:
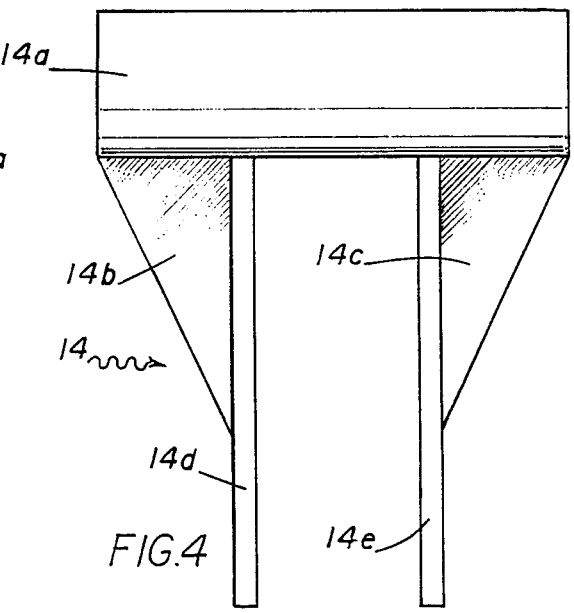
FIG. 4 is a front view of an adaptor member which is attached to the body and engages the device attached to the chassis.
Figure 5:
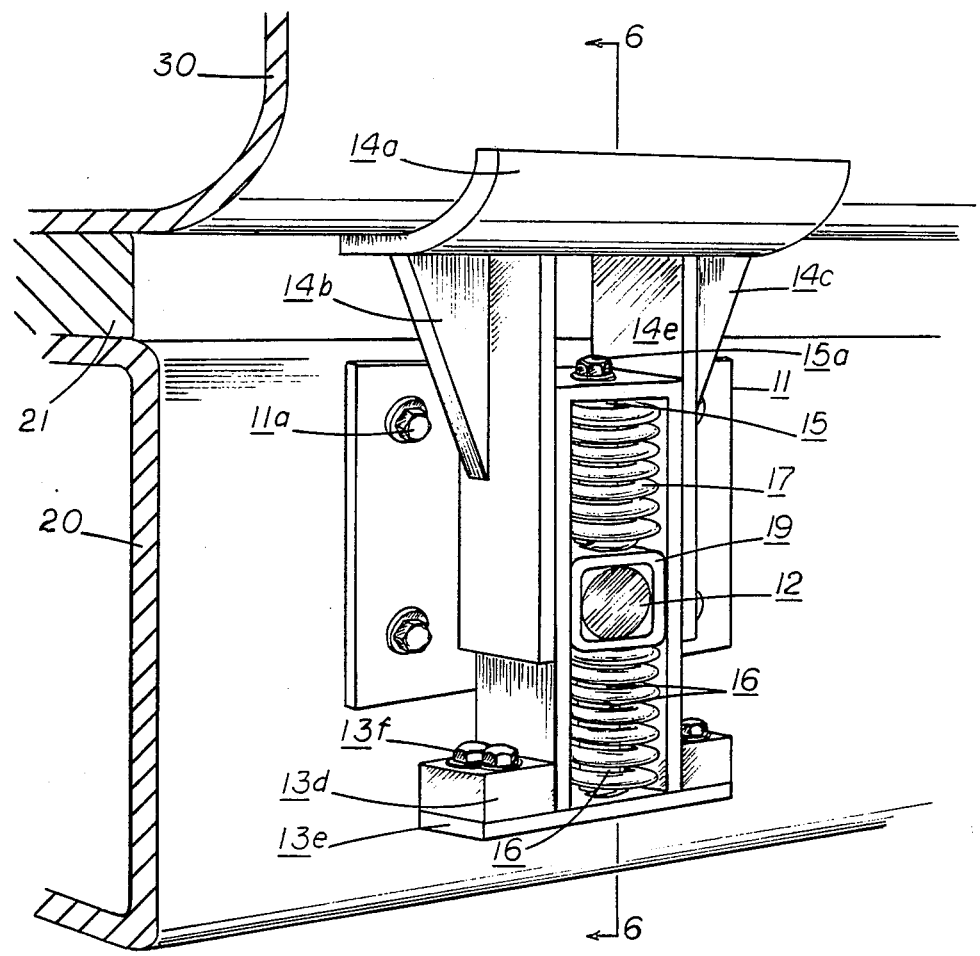
FIG. 5 is a perspective view of an assembly of the body, mount and chassis.
Figure 6:
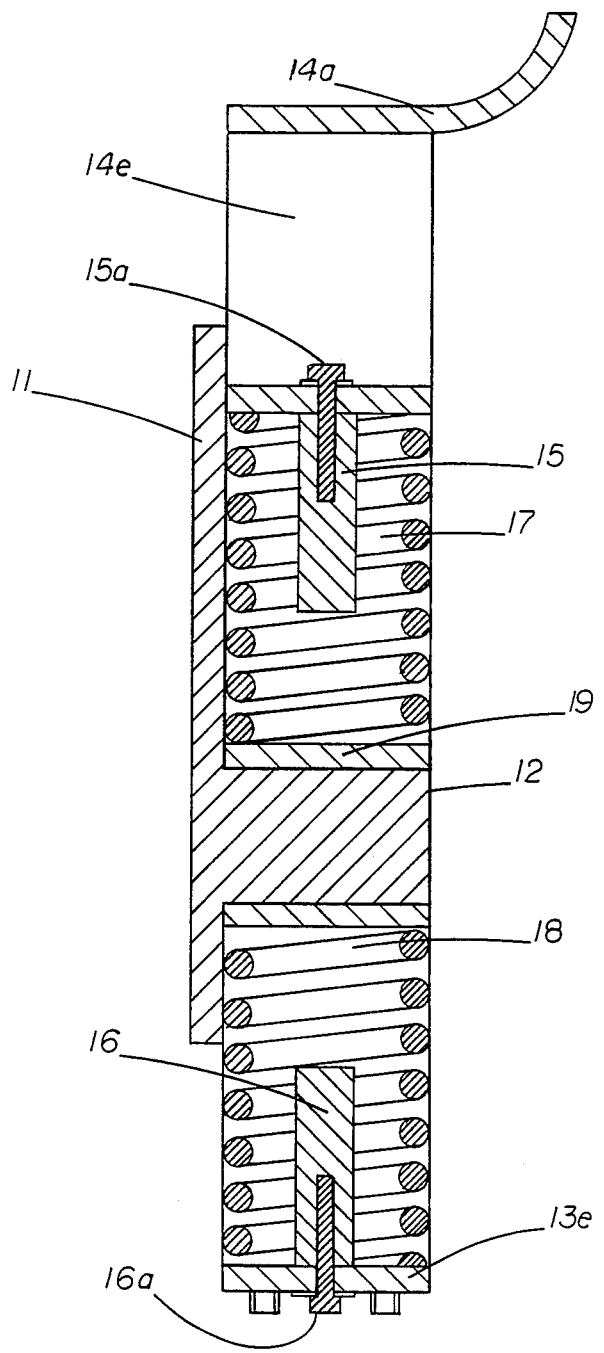
FIG. 6 is a cross-section through line 6—6 in FIG. 5.

Referring now to the drawing, a back plate 11 is attached by bolts 11a to the chassis 20. Attached to and extending forward from plate 11 is a gungeon pin 12. Surrounding gungeon pin 12 is a slideable gungeon pin adaptor 19. A frame 13 having a top portion 13a and side braces 13b and 13c is connected through adaptor member 14 to the body 30. A layer of shock-resistant material 21 is spaced between the chassis 20 and the body 30.

The frame 13, which is connected to the body 30, through adaptor member 14 has top and bottom vertical stops 15 and 16, attached by bolts 15a and 15b. The stops also act as guides for compression springs 17 and 18. The springs extend to the pin adaptor 19 and act to reduce the stress loads by cancelling. The gungeon pin 12 is welded to plate 11 and extends outwardly the same distance as the depth of side braces 13b and 13c.

In a typical installation, the plate 11 is bolted to the chassis. After the plane of the body resting on the chassis has been established, and the body centered on the chassis in a proper location for appropriate weight distribution, the bracked frame 13 is placed perpendicularly to the body. Then an adaptor 14 having about 0.025 inches clearance between the plate 11 and the frame 13 is placed in position. The adaptor 14 is tacked in place, the springs removed and the bottom plate down. Then the adaptor 14 is welded to the bracket frame 13. Typical dimensions of the device are a maximum depth of 3 inches, a height of 8½ inches and a width of 9½ inches. Where the body and chassis are on the same plane, a flat or parallel adaptor can be used. It should be noted that all components have a high-visibility and can be easily inspected for failure.

I claim:

1. A spring-loaded mount for connecting a truck body to a truck chassis which permits articulation comprising outwardly extending gungeon pin means attached to the chassis and cooperable spring means attached to the body; said spring means comprising a housing surrounding said gungeon pin means and containing a pair of springs acting on opposite sides of said gungeon pin means.

2. The mount of claim 1 wherein an insulating means is spaced between the body and the chassis.

3. The mount of claim 1 wherein said spring housing comprises a spring retaining frame having side braces, a top member, a bottom member and an extension for securing the frame to the body.

4. The mount of claim 1 or 3 wherein a slideable collar surrounds said gungeon pin means and isolates it from said springs.

5. The mount of claim 1 wherein said housing includes a pair of opposing stops within said springs.

6. The mount of claim 3 wherein said bottom member is detachable, thus permitting removal for insertion of the springs.

* * * * *